US009779442B1

(12) United States Patent
Cimic et al.

(10) Patent No.: US 9,779,442 B1
(45) Date of Patent: Oct. 3, 2017

(54) PROVIDE A RECOMMENDATION FOR GARDEN ITEMS

(71) Applicant: Amazon Technologies, Inc., Reno, NV (US)

(72) Inventors: Senad Cimic, Seattle, WA (US); Sairam Chinta, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 617 days.

(21) Appl. No.: 14/303,445

(22) Filed: Jun. 12, 2014

(51) Int. Cl.
*G06Q 30/00* (2012.01)
*G06F 17/30* (2006.01)
*G06Q 30/06* (2012.01)
*G06K 9/00* (2006.01)

(52) U.S. Cl.
CPC ... *G06Q 30/0631* (2013.01); *G06F 17/30873* (2013.01); *G06K 9/0014* (2013.01); *G06Q 30/0641* (2013.01); *G06Q 30/0643* (2013.01)

(58) Field of Classification Search
None
See application file for complete search history.

(56) References Cited

U.S. PATENT DOCUMENTS

| 2009/0083327 A1* | 3/2009 | Ringham | G06Q 10/10 |
| 2009/0216661 A1* | 8/2009 | Warner | G06Q 30/02 705/26.1 |
| 2012/0231425 A1* | 9/2012 | Calman | G06K 9/00671 434/93 |
| 2015/0052130 A1* | 2/2015 | Chang | G06F 17/3087 707/732 |
| 2015/0131867 A1* | 5/2015 | Lin | G06T 7/0014 382/110 |
| 2015/0186953 A1* | 7/2015 | Gross | G06Q 30/0643 705/14.58 |
| 2015/0347544 A1* | 12/2015 | Caraballoso | G06F 3/04842 707/723 |

OTHER PUBLICATIONS

Lim E et al, "The validity of VRML images as a stimulus for landscape assessment" Landscape and Urban Planning, vol. 77, Issues 1-2, Jun. 15, 2006, pp. 80-93.*

* cited by examiner

*Primary Examiner* — Michael Misiaszek
*Assistant Examiner* — Matthew Todd
(74) *Attorney, Agent, or Firm* — Kilpatrick Townsend & Stockton LLP

(57) ABSTRACT

Techniques for identifying and recommending garden items may be provided. For example, image and non-image data about a garden may be received and analyzed. Identifications of garden items from the garden and related constraints may be determined accordingly. The identifications and the constraints may be used to recommend uses of the garden items and/or to recommend additional garden items that may be ordered and used in conjunction with the garden items.

20 Claims, 7 Drawing Sheets

PROVIDE A RECOMMENDATION FOR GARDEN ITEMS

BACKGROUND

More and more users are turning to network-based resources, such as electronic marketplaces, to purchase items. A network-based resource may provide a user experience unmatched by a more traditional brick and mortar store. For example, the network-based resource may offer a larger and more diverse selection of items. Further, for some of the items, there may be a number of sellers with different offers. As such, a consumer may not only obtain items from an available rich selection, but may also obtain the items at the most convenient offers.

In a particular example, a network-based resource may offer items related to gardening, such as plants, gardening tools, gardening instructions, and other items. Typically, a consumer may operate a computing device to access this network-based resource, search for garden-related items, get descriptions, and purchase one or more of the items accordingly.

BRIEF DESCRIPTION OF THE DRAWINGS

Various embodiments in accordance with the present disclosure will be described with reference to the drawings, in which.

DETAILED DESCRIPTION

Figure 1:
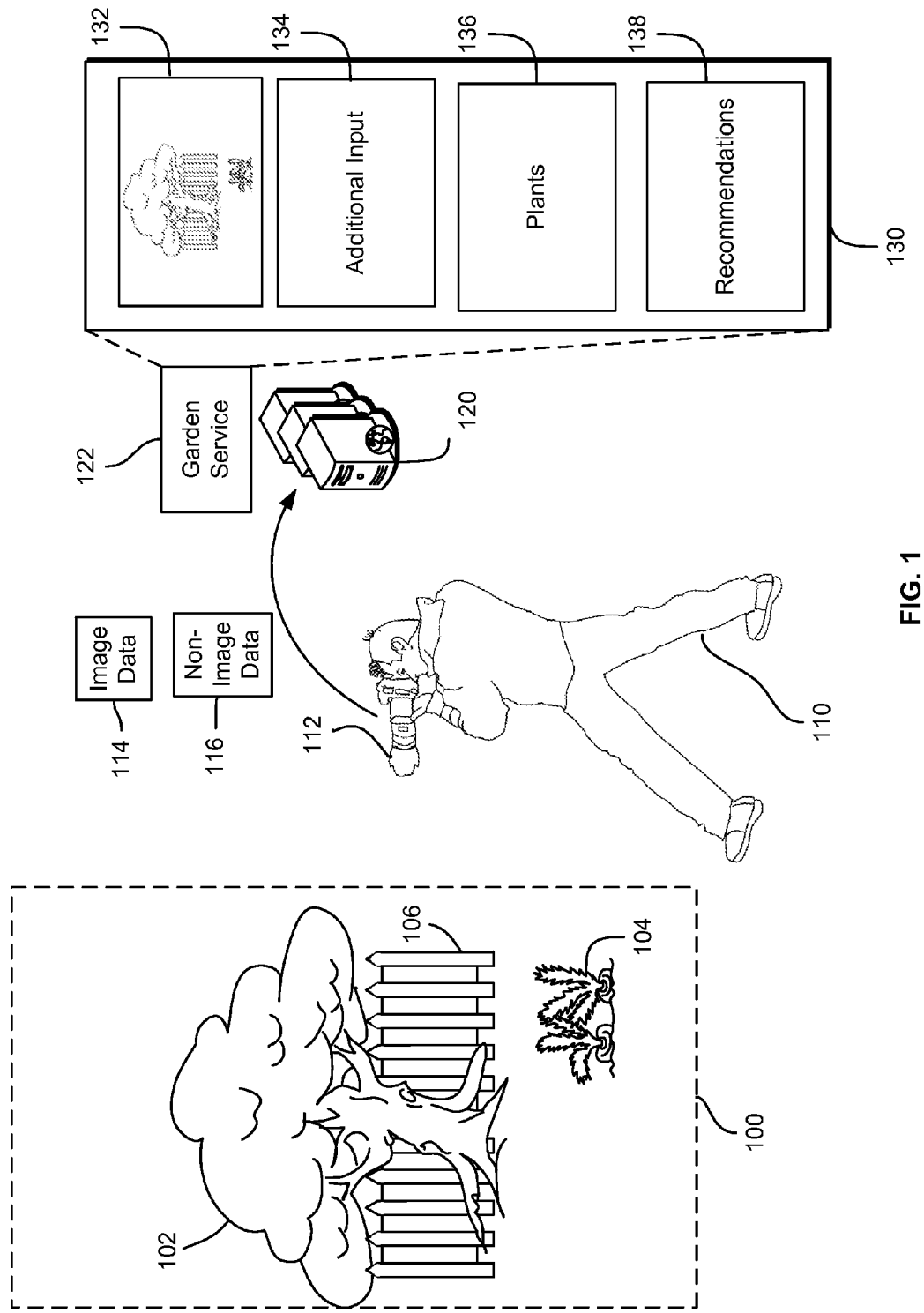
FIG. 1 illustrates an example computing environment for identifying garden items and providing recommendations for other garden items, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing a user's experience when, for example, operating a computing device to obtain information about a garden. Specifically, a garden service may be implemented within the context of a network-based resource of an electronic marketplace and may be configured to identify plants and provide recommendations associated with the plants. In an example, the garden service may receive images of a garden from the computing device and may analyze the images to determine plants growing in the garden. The garden service may also determine, based on the images and other sources of information, constraints associated with the garden, the plants, and/or the user. The constraints may relate to, for example, additional plants that can grow in the garden, an amount of plant harvesting, and user preferences.

Based on the determined plants and constraints, the garden service may provide various types of recommendations to the computing device of the user. A recommendation may include recipes that can use portions of some of the plants as ingredients. This type of recommendation may also identify other ingredients available for purchase from the electronic marketplace to complete the recipes. Another recommendation may include new plants that can be purchased from the electronic marketplace and that can be added to the garden. Additionally, the garden service may recommend gardening tools and other garden items available at the electronic marketplace to maintain and/or expand the garden.

To illustrate, Evelyn may be a food enthusiast who may like cooking with home-grown vegetables. Having recently moved to Seattle, Evelyn may not be familiar with the different plants growing in her backyard and/or with recipes that can use these plants. To overcome this unfamiliarity, Evelyn may use her smartphone to take and upload photos of her backyard to the garden service. In turn, the garden service may implement image recognition algorithms to analyze the photos, determine the vegetables growing in the backyard, and determine other objects in the backyard that may limit what new plants may be added. For example, the garden service may determine that tomatoes, cucumber, and mint may be growing in the north-end of the backyard. As such, the garden service may recommend a Greek salad recipe using these vegetables and may identify other ingredients such as feta cheese and olive oil for purchase from the electronic marketplace. The garden service may also determine from the images that a large brick pizza oven structure may shade the south-end of the backyard. As such, the garden service may recommend a wild ginger plant, also available at the electronic marketplace, as a low-shade plant that can be grown in the south-end of the backyard.

In the interest of clarity of explanation, the embodiments are described in the context of an electronic marketplace, plants, gardens, and images. An electronic marketplace may refer to a network-based resource or a collection of network-based resources configured to facilitate offers and purchases of items. A plant may refer to any type of biological organism that can be grown or harvested including, for example, herbs, fruit plants, bushes, shrubs, trees, vegetation, greenery, or any other type of plants. A physical space may include a garden, yard, field or any other space for growing items (e.g., plants, vegetation, fruits, trees, legumes, etc.) and may include, for example, an outdoor space, an indoor space, a green house, a portion of a space, or other spaces that may be partially or fully dedicated to growing items. An image may refer to a photo, picture, or other types of images captured or generated by a computing device.

Nevertheless, the embodiments described herein may not be limited to an electronic marketplace, plants, gardens, and images. Instead, the embodiments may be similarly applied to any network-based resource, garden item, gardening space, and visual representation. For example, a network-based resource may refer to a web site, a web page, or some other resource for providing information about an item. Similarly, a garden item may refer to an item related to a garden. For example, a garden item growing in a garden may refer to a plant. In comparison, a garden item for maintaining a garden may include a gardening tool. Likewise, a gardening space may refer to a space for growing and/or for using garden items. A visual representation of an item may refer to data that can be displayed at a user interface to provide a graphical representation of the item. More particularly, the embodiments may allow a garden service to be implemented as a service associated with a network-based resource. The service may be configured to identify garden items growing in a garden space based at least in part on a visual representation of the garden space and to provide recommendations for additional garden items. These and other features are further described herein below with reference to the figures.

Turning to FIG. 1, that figure illustrates an example computing environment that may be configured to identify plants in a garden and provide related recommendations to a user, such as a consumer of an electronic marketplace. More particularly, the user may not be familiar with the plants growing in the garden. Or even if familiar, the user may not easily understand how the plants can be used and/or maintained and how the garden can be expanded and/or improved. In such situations, the user may operate a computing device to access a garden service that the electronic marketplace may implement. The garden service may analyze information about the garden received from the computing device and may respond with identifications of the plants and related recommendations. As used herein, a "service" such as a garden service may include one or more software modules executed by a computing device to implement various functions. Such a service may also be referred to as a "computing service."

As illustrated in FIG. 1, a user 110 may operate a computing device 112 to capture and upload images of a garden 100 to a garden service 122. A service provider of an electronic marketplace may implement, using a service provider computer 120, the garden service 122. The garden service 122 may provide a user interface 130 displayable at the computing device 112, or some other computing device of the user 110. In particular, the garden service 122 may present information about the garden 100 and various recommendations at the user interface 130.

The garden 100 may include a variety of plants, such as a fruit tree 102 and a vegetable plant 104. The garden 100 may also include objects that may constrain what can be grown in the garden, such as a fence 106. More particularly, various constraints related to the garden 100 may limit what can be grown, including weather, water, soil, temperature, sunlight, and shade constraints. Some of these constraints, such as weather, may depend on a location of the garden 100. Other constraints, such as shade, may depend on the plants and/or the objects located in or nearby the garden 100. For example, the tree 102 or the fence 106 may create shade zones that, depending on the orientation of the garden 100, the sunlight, and/or other parameters may limit the type and quantity of plants that can be grown in such zones.

The computing device 112 may be any computing device configured to capture and transmit images and other data. For example, as illustrated in FIG. 1, the computing device 112 may include a camera for capturing images of the garden 100, a memory for storing computer readable instructions to process the images, and a processor for executing the computer readable instructions, and a transmitter for transmitting the image to the service provider computer 120. Although FIG. 1 illustrates these various components as embodied in a single computing device 112, the embodiments may not be limited as such. Instead, the components may be distributed over multiple computing devices. For example, the user 110 may operate a camera for capturing the images and, separately, a personal computer to receive the images from the camera and to transmit such images to the service provider computer 120.

The user 110 may operate the computing device 112 to transmit images and other information about the garden 100 to the service provider computer 120. As illustrated, the transmitted data may include image data 114 representative of the images of the garden 100 and non-image data 116 representative of the other information about the garden 100.

In an embodiment, the image data 114 may correspond to a plurality of images of the garden 100. More particularly, images from different angles of the garden 100 may be captured and transmitted. For example, if the garden 100 has a certain polygon shape such as a rectangle, an image taken from each corner of the polygon can be transmitted to the service provider computer 120. Using a plurality of images from different angles may allow the garden service 122 to build a model of the garden 100 that can encompass the various areas of the garden 100.

In comparison, the non-image data 116 may include other information that may not be derived from the images, but that may be needed to identify the plants and/or provide related recommendations. For example, the non-image data 116 may identify a location of the garden 100 (e.g., GPS coordinates, street address, or other location identifier) and specify cardinal directions of the images (e.g., whether an image of the garden 100 corresponds to a north, west, south, or east orientation of the garden 100). In an embodiment, the location information need not be included in the non-image data 116 if, for example, the image data 114 include such information (e.g., if the computing device 112 automatically geo-tags the images). Ascertaining the cardinal directions and the location may allow the garden service 122 to impose constraints, such as weather, sunlight, shade, plant types that can grow at the location, and/or other constraints in the model of the garden 100.

In a further embodiment, the non-image data 116 may also include information inputted by the user 110, such as text descriptions, describing certain aspects of the garden 100, the plants, and/or the objects. For instance, upon analyzing the image data 114, if the garden service 122 determines with some likelihood that a plant is growing in the garden 100, and if the likelihood is below an acceptable threshold, the garden service 122 may provide a request for additional information. In such a case, the user may further describe the plant using a text description, may capture and transmit additional images, or may confirm that the determined plant is correct. Additionally or alternatively, the garden service 122 may provide a series of questions (e.g., a size of the plant, a shape of a leaf, and/or other question) and, based on answers from the user, may further determine the plant.

The service provider computer 120 may receive the image data 114 and the non-image data 116 from the computing device 112 over a network and may input this data to the garden service 122. In turn, the garden service 122 may analyze the image data 114 and the non-image data 116 to determine the plants and the applicable constraints and to generate the model of the garden 100. Based on the model, the garden service may cause the computing device 112 to display a virtual space (e.g., a virtual garden) that may provide visual representations of the plants and the constraints. Further, based on the plants and the constraints, the garden service 122 may provide various types of recommendations. As illustrated in FIG. 1, outputs from the garden service 122 may be displayed at the user interface 130 of the computing device 112. For example, information about the model of the garden 100 may be displayed as a visual representation 112, information about the identified plants may be displayed in a plant field 136, and recommendations may be displayed in a recommendation field 136. Further and as described herein above, if further information is needed from the user 110, an additional input field 134 may be displayed at the user interface 130.

The visual representation 132 may present information about the garden 100 and may, for example, identify the plants, illustrate the objects, and/or describe some or all of the constraints. For example, the visual representation 132 may include a virtual garden where the plants may be tagged with descriptive text for identification. The virtual garden may also illustrate a shade zone around an object (e.g., the fence 106), a stay-out zone around a plant (e.g., the fruit tree 102), or other constraints. Further, the virtual garden can be interactive in various ways. For example, by operating the computing device 112 to select a plant, a web page or some other document about the plant may be displayed at the user interface 130. In another example, the virtual garden may support drag and drop operations, where the user 110 can select and add plants or other objects from the recommendation field 138 into the virtual garden for preview. In this example, the selection and/or addition of a plant may be subject to the constraints. For instance, if the user 110 selects a plant that requires a high amount of sunlight, the virtual garden may not allow the addition of this plant in a shade zone around the fence 106. In yet another example, the virtual garden may display the evolution of the garden over time. For example, the user 110 may select a season or an amount of time in the future (e.g., a number of years). In response the virtual garden may preview how the garden may look like at that time. This preview need not happen with user input, such as input specifying the amount of time. Instead, the virtual garden may play an automatic simulation of the how garden may look like over time. In this simulation, every second, or some other amount of the simulation time, may represent a week, a month, or some other amount of garden growth time. As such, within a few seconds or so, the user may perceive how the garden may look like in a season, in the four seasons, over the years, or the like.

The plant field 136 may be a descriptive field for presenting information about the identified plants. For example, the plant field 136 may include a list of the plants. The list may identify, provide short descriptions, show images of the plants retrieved from another source, provide instructions for maintaining and harvesting the plants, and/or describe uses of the plants.

In comparison, the recommendation field 138 may also be a descriptive field but may be used to present information about various types of recommendations. One type of recommendations may include recommending uses of the plants. For example, this recommendation type may include providing recipes that can combine various amounts or portions of the identified plants as ingredients. Another type of recommendations may include recommending additional items that can be ordered from the electronic marketplace. For example, this recommendation type may also include recipes, but these recipes may include additional ingredients not found in the garden 100. Instead, such recommendations may identify the additional ingredients as items offered for purchase from the electronic marketplace. By operating the computing device 112, the user 110 may manually add these ingredients to a shopping cart for purchase. Alternatively, by selecting a recipe, the additional ingredients may be automatically added to the shopping cart without further input from the user 110. In another example, the recommended items that can be ordered from the electronic marketplace may include garden items, such as additional plants, gardening tools (including, for example, green houses, garden fixtures, plant fixtures, etc.), fertilizers, and other items. In this example, the user 110 may also operate the computing device 112 to add some or all of these items to a shopping cart. The recommendation field 138 may list these various recommendations, identifying and describing the various items, allowing the user 110 to browse for more information about each of the items, and facilitating purchases of the items from the electronic marketplace.

Hence, by using the computing environment of FIG. 1, a service provider may implement a garden service that can enhance a user's experience. In particular, if the user is unfamiliar or uncertain about plants in a garden, the user may operate a computing device and turn to the garden service to receive information about the plants and related recommendations.

Figure 2:
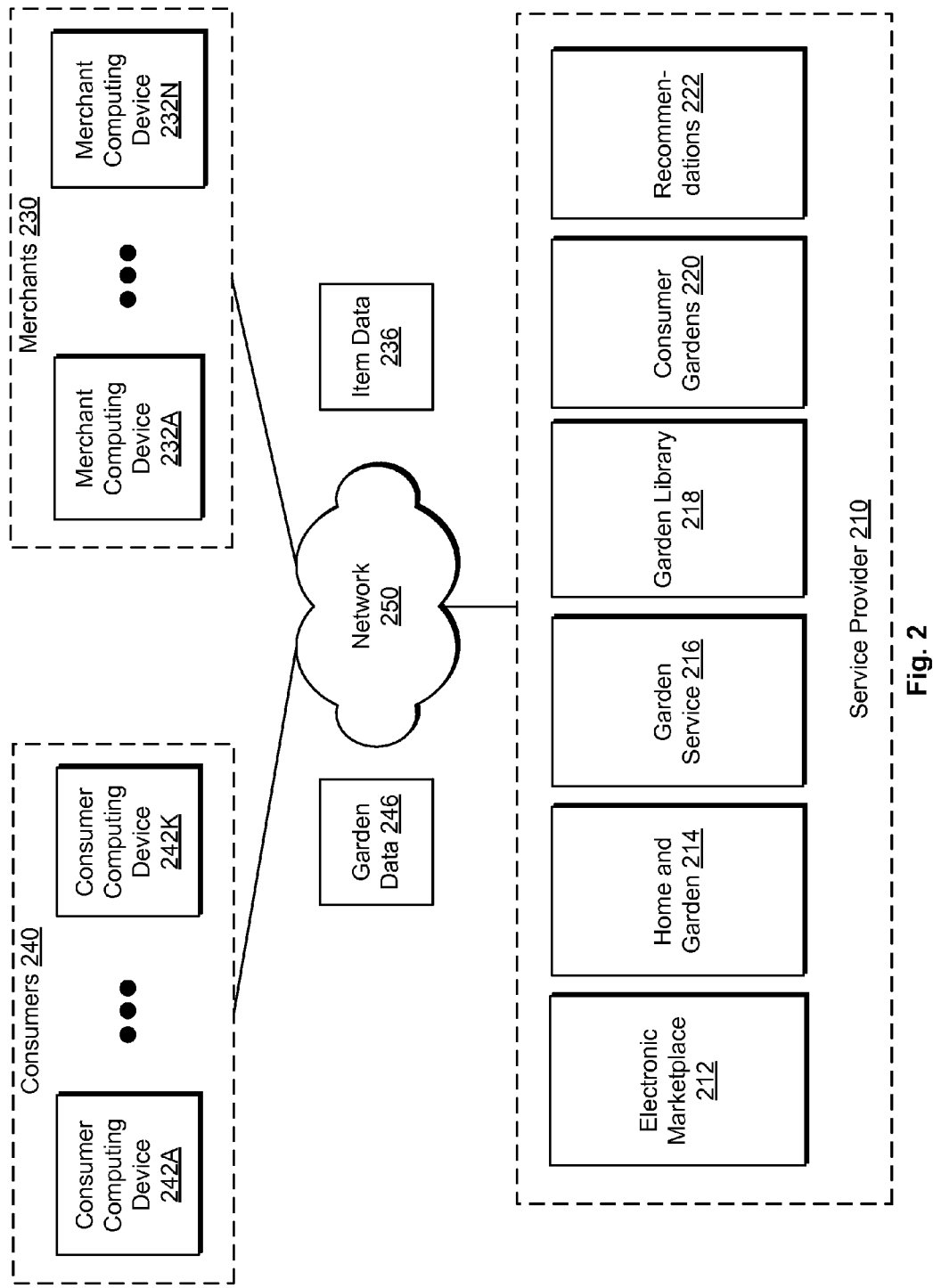
FIG. 2 illustrates an example network-based resource providing garden items in association with an electronic marketplace, according to embodiments.

Turning to FIG. 2, that figures illustrates a computing environment for implementing a garden service within the context of an electronic marketplace. In particular, a garden service, similar to the one described herein above may be implemented to identify plants in a garden and to provide recommendations for using the plants and/or ordering additional items from the electronic marketplace.

As illustrated, a service provider 210 may provide an electronic marketplace 112 accessible to merchants 230 and to consumers 240 over a network 250. The merchants 230 may operate merchant computing devices 232A-N to offer items at the electronic marketplace 212, including garden items. In comparison, the consumers 240 may operate consumer computing devices 242A-N to purchase items from the electronic marketplace 212, including garden items.

A network-based resource (e.g., a web page) of the electronic marketplace 212 may be associated with an item. For example, the network-based resource may allow the merchants 230 and/or the service provider 210 to provide information for ordering an item. The network-based resource may also allow the consumers 240 to review this information and make a purchase decision.

Information about garden items may be grouped or organized in a home and garden section 214 of the electronic marketplace 212. For example, the electronic marketplace 212 may include, among other things, network-based resources for offering the garden items. These network-based resources may be grouped under the home and garden section 214.

As such, the service provider 210 may operate the electronic marketplace 212 to facilitate interactions between the service provider 210, the merchants 230 and the consumers 240 over the network 250. A merchant may include an item provider, a seller, or any user interfacing with the electronic marketplace 212 for offering items. Each one of the merchants 230 may operate one or more of the merchant computing devices 232A-N to access the electronic marketplace 212 and perform various merchant-related functions. A merchant-related function may include providing item data 236 associated with, for example, offering a garden item at the electronic marketplace 212. A consumer may be an item recipient, a buyer, or any user reviewing, browsing, ordering, obtaining, purchasing, or returning an item of a merchant. Each one of the consumers 240 may operate one or more of the consumer computing devices 242A-K to access the electronic marketplace 212 and perform various consumer-related functions. A consumer-related function may include providing garden data 246 associated with, for example, a garden of a consumer. The garden data 246 may include data similar to the image data 114 and non-image data 116 of FIG. 1. For example, the garden data 246 may represent one or more images of a garden and related information.

The service provider 210 may further implement a garden service 216, similar to the garden service 122 of FIG. 1. The garden service 216 may be provided as a service to users, such as the consumers 240 and/or the merchants 230, as part of the electronic marketplace 212. For example, a user may need to have an account at the electronic marketplace 212 to be able to access and use the garden service 216.

In an embodiment, the garden service 216 may receive and analyze the garden data 246 to determine plants of a garden and to provide recommendations for uses of the plants and/or for additional items, such as garden items, that may be ordered from the electronic marketplace 212. As part of analyzing the garden data 246, the garden service may access a garden library 218 to identify the plants, uses of the plants, and related recommendations. The garden library 218 may be maintained by the service provider 210, or may be maintained by a third party and can be accessible to the service provider 210.

In an embodiment, the garden library 218 may include a database or some other structure for storing information about plants. This information may be used for determining matches with information from the analysis of the garden data 246. The matches may identify the plants in the garden. Further, the information in the garden library 218 may be used for determining recommendations. For example, the information may include descriptions of uses of the plants (e.g., recipes), instructions for handling the plants, relationships with other plants (e.g., whether two plants can be planted together or whether there would be a conflict), relationships with garden items (e.g., gardening tools), plant-specific constraints (e.g., needed weather, watering, soil, shade, sunlight, and other constraints). A recommendation engine can parse this information to generate the recommendations. In an embodiment, the garden service 216 may integrate the recommendation engine. In another embodiment, the garden service 216 may interface with the recommendation engine.

Once the plants of the garden are identified, the garden service 216 may store information about the plants and/or the garden in consumer gardens 220. The consumer gardens 220 may be a database or some other structure for storing the information. In an embodiment, the garden service 216 may store the information in association with a location of the garden (e.g., GPS coordinates, street address, zip code, or some other location identifier). In this way, the service provider 210 may provide additional garden-related services to users. For example, a user interested in determining what plants may be growing in a certain zip code may turn to the garden service 216, or some other service implemented by the service provider 210, to make such a determination. In another example, when the garden changes hands between users (e.g., a user purchases or rents a house that includes the garden of another user), the new user may turn to the garden service 216, or some other service of the service provider 210, to identify the plants. In this example, a real estate service configured to list the house for sale or rent may interface with the garden service 216 or the other service to receive and publish the information about the garden on a web page listing the house. In yet another example, the service provider 210 may provide the merchants 230 access to the consumer gardens 200 to offer value-added services. For instance, based on a consumer garden of a particular consumer, a merchant 230 may determine landscaping, trimming, maintaining, and other value-added services that can be offered to the particular consumer.

Once a recommendation to a user is generated, the garden service 216 may store information about the recommendation in recommendations 222. The recommendations 222 may be a database or some other structure for storing the information. Further, the garden service 216, or some other service that the service provider 210 may implement, may track user selections of items from the recommendation and may update the recommendations 222 to store indications about the selections. In this way, the service provider 210 (e.g., by using the gardening service 216 or a recommendation engine) may determine user preferences and/or may determine additional constraints that can be imposed in generating recommendations. For example, if over time, the user typically selects recipes that include tomatoes as an ingredient, the gardening service 216 may determine that the user may prefer recipes that use tomatoes. As such, when the user further requests a recommendation, the gardening service 216 may rank recommendations that use tomatoes higher than other recipes. Similarly, if the gardening service 216 identifies that the user's garden does not include a tomato plant, the gardening service 216 may recommend, if possible, a purchase of this plant from the electronic marketplace 212. However, if the user's garden includes a tomato plant, the gardening service 216 may vary the recommendations to avoid over-harvesting of the plant by proposing recipes that do not use tomatoes and/or by notifying the user of the over-harvesting risk. In this case, the gardening service 216 may set this type of over-harvesting as a constraint for generating recommendations. In yet another example, the recommendation to a particular user can use information about a garden of another user from the consumer gardens 220. For instance, based on a location of a garden of the particular user, the gardening service 216 may determine a nearby garden from the consumer gardens 222, such as a garden of a neighbor. Because of the location proximity, both gardens may meet similar garden constraints, such as weather, watering, soil, sunlight, and/or other constraints. Thus, if the garden of the neighbor has been growing properly, that could indicate a healthy garden. In this case, the gardening service 216 may compare the two gardens and may recommend, to the particular user, plants or other garden items similar to the ones found in the neighbor's garden.

Hence, by using the computing environment of FIG. 2, a service provider may implement a garden service within the context of an electronic marketplace. The garden service may provide various services to, for example, consumers of the electronic marketplace. These services may include identifying plants in the consumer's gardens, providing recommendations for recipes, garden items, and other items available at the electronic marketplace. The recommendations may take into account various constraints associated with the plants, the gardens, and/or the consumers. The services may also include recording information about the gardens and providing the information to various users.

Figure 3:
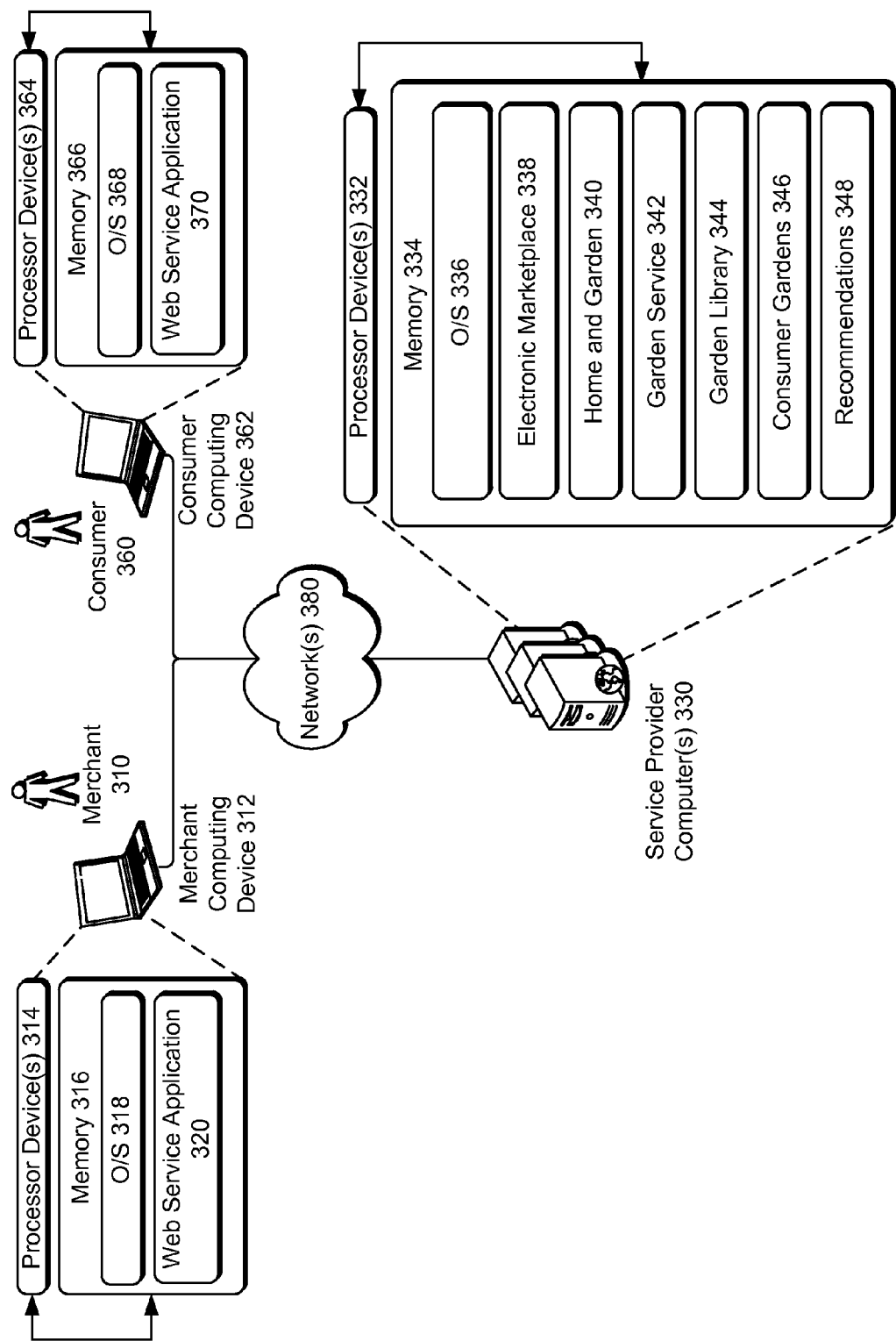
FIG. 3 illustrates an example architecture for providing a network-based resource in, including at least one user device and/or one or more service provider computers connected via one or more networks, according to embodiments.

Turning to FIG. 3, that figure illustrates an example end-to-end computing environment for identifying plants in a garden and providing related recommendations. In this example, a service provider may implement a garden service, such as the garden service 316 of FIG. 2, within the context of, for example, an electronic marketplace available to users, such as the merchants 230 and the consumers 240 of FIG. 2.

In a basic configuration, a merchant 310 may utilize a merchant computing device 312 to access local applications, a web service application 320, a merchant account accessible through the web service application 320, a web site or any other network-based resources via one or more networks 380. In some aspects, the web service application 320, the web site, and/or the merchant account may be hosted, managed, and/or otherwise provided by one or more computing resources of the service provider, such as by utilizing one or more service provider computers 330. The merchant 310 may use the local applications and/or the web service application 320 to interact with the network-based resources of the service provider. These interactions may include, for example, offering items for sale such as garden items.

In some examples, the merchant computing device 312 may be any type of computing devices such as, but not limited to, a mobile phone, a smart phone, a personal digital assistant (PDA), a laptop computer, a thin-client device, a tablet PC, etc. In one illustrative configuration, the merchant computing device 312 may contain communications connection(s) that allow merchant computing device 312 to communicate with a stored database, another computing device or server, merchant terminals, and/or other devices on the networks 380. The merchant computing device 312 may also include input/output (I/O) device(s) and/or ports, such as for enabling connection with a keyboard, a mouse, a pen, a voice input device, a touch input device, a display, speakers, a printer, etc.

The merchant computing device 312 may also include at least one or more processing units (or processor device(s)) 314 and one memory 316. The processor device(s) 314 may be implemented as appropriate in hardware, computer-executable instructions, firmware, or combinations thereof. Computer-executable instruction or firmware implementations of the processor device(s) 314 may include computer-executable or machine-executable instructions written in any suitable programming language to perform the various functions described.

The memory 316 may store program instructions that are loadable and executable on the processor device(s) 314, as well as data generated during the execution of these programs. Depending on the configuration and type of merchant the computing device 312, the memory 316 may be volatile (such as random access memory (RAM)) and/or non-volatile (such as read-only memory (ROM), flash memory, etc.). The merchant computing device 312 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 316 may include multiple different types of memory, such as static random access memory (SRAM), dynamic random access memory (DRAM), or ROM.

Turning to the contents of the memory 316 in more detail, the memory may include an operating system (O/S) 318 and the one or more application programs or services for implementing the features disclosed herein including the web service application 320. In some examples, the merchant computing device 312 may be in communication with the service provider computers 330 via the networks 380, or via other network connections. The networks 380 may include any one or a combination of many different types of networks, such as cable networks, the Internet, wireless networks, cellular networks, and other private and/or public networks. While the illustrated example represents the merchant 310 accessing the web service application 320 over the networks 380, the described techniques may equally apply in instances where the merchant 310 interacts with the service provider computers 330 via the merchant computing device 312 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a consumer 360 may utilize consumer computing device 362 to access local applications, a web service application 370, a consumer account accessible through the web service application 370, or a web site or any other network-based resources via the networks 380. In some aspects, the web service application 370, the web site, and/or the user account may be hosted, managed, and/or otherwise provided by the service provider computers 330 and may be similar to the web service application 320, the web site accessed by the computing device 312, and/or the merchant account, respectively.

The consumer 360 may use the local applications and/or the web service application 370 to interact with the network-based resources of the service provider. These interactions may include, for example, searching for items offered by the merchant 310 at the network-based resources, and ordering items. The interactions may also include providing garden data to the garden service and receiving identification of plants and related recommendations.

In some examples, the consumer computing device 362 may be configured similarly to the merchant computing device 312 and may include at least one or more processing units (or processor device(s)) 364 and one memory 366. The processor device(s) 364 may be implemented as appropriate in hardware, computer-executable instructions, firmware, or combinations thereof similarly to the processor device(s) 313. Likewise, the memory 366 may also be configured similarly to the memory 316 and may store program instructions that are loadable and executable on the processor device(s) 364, as well as data generated during the execution of these programs. For example, the memory 366 may include an operating system (O/S) 368 and the one or more application programs or services for implementing the features disclosed herein including the web service application 370.

As described briefly above, the web service applications 320 and 370 may allow the merchant 310 and consumer 360, respectively, to interact with the service provider computers 330. The service provider computers 330, perhaps arranged in a cluster of servers or as a server farm, may host the web service applications 320 and 370. These servers may be configured to host a web site (or combination of web sites) viewable via the computing device 312 and 362. Other server architectures may also be used to host the web service applications 320 and 370.

The web service applications 320 and 370 may be capable of handling requests from many merchant 310 and consumer 360, respectively, and serving, in response, various interfaces that can be rendered at the computing device 312 and 362 such as, but not limited to, a web site. The web service applications 320 and 370 can interact with any type of web site that supports interaction, including social networking sites, electronic retailers, informational sites, blog sites, search engine sites, news and entertainment sites, and so forth. As discussed above, the described techniques can similarly be implemented outside of the web service applications 320 and 370, such as with other applications running on the computing device 312 and 362, respectively.

The service provider computers 330 may, in some examples, provide network-based resources such as, but not limited to, applications for purchase and/or download, web sites, web hosting, client entities, data storage, data access, management, virtualization, etc. The service provider computers 330 may also be operable to provide web hosting, computer application development, and/or implementation platforms, or combinations of the foregoing to the merchant 310 and consumer 360.

The service provider computers 330 may be any type of computing device such as, but not limited to, a mobile phone, a smart phone, a personal digital assistant (PDA), a laptop computer, a desktop computer, a server computer, a thin-client device, a tablet PC, etc. The service provider computers 330 may also contain communications connection(s) that allow service provider computers 330 to communicate with a stored database, other computing devices or server, merchant terminals, and/or other devices on the network 380. The service provider computers 330 may also include input/output (I/O) device(s) and/or ports, such as for enabling connection with a keyboard, a mouse, a pen, a voice input device, a touch input device, a display, speakers, a printer, etc.

Additionally, in some embodiments, the service provider computers 330 may be executed by one more virtual machines implemented in a hosted computing environment. The hosted computing environment may include one or more rapidly provisioned and released network-based resources, which network-based resources may include computing, networking, and/or storage devices. A hosted computing environment may also be referred to as a cloud computing environment. In some examples, the service provider computers 330 may be in communication with the computing devices 312 and 362 via the networks 380, or via other network connections. The service provider computers 330 may include one or more servers, perhaps arranged in a cluster, or as individual servers not associated with one another.

In one illustrative configuration, the service provider computers 330 may include at least one or more processing units (or processor devices(s)) 332 and one memory 334. The processor device(s) 332 may be implemented as appropriate in hardware, computer-executable instructions, firmware, or combinations thereof. Computer-executable instruction or firmware implementations of the processor device(s) 332 may include computer-executable or machine-executable instructions written in any suitable programming language to perform the various functions described.

The memory 334 may store program instructions that are loadable and executable on the processor device(s) 332, as well as data generated during the execution of these programs. Depending on the configuration and type of the service provider computers 330, the memory 334 may be volatile (such as random access memory (RAM)) and/or non-volatile (such as read-only memory (ROM), flash memory, etc.). The service provider computers 330 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 334 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 334 in more detail, the memory may include an operating system (O/S) 336, code for an electronic marketplace 338, code for a home and garden section 340 of the electronic marketplace 338, code of a garden service 342, data related to a garden library 344, data related to consumer gardens 346, and data related to recommendation 348. The garden service 342 may be a service similar to the garden service 216 of FIG. 2. Although FIG. 3 illustrates the various data as stored in the memory 334, this data or portion of the data may be additionally or alternatively stored at a storage device remotely accessible to the service provider computers 330. Configurations and operations of the garden service 342 are further described in greater detail below with reference to at least FIGS. 4-6.

Figure 4:
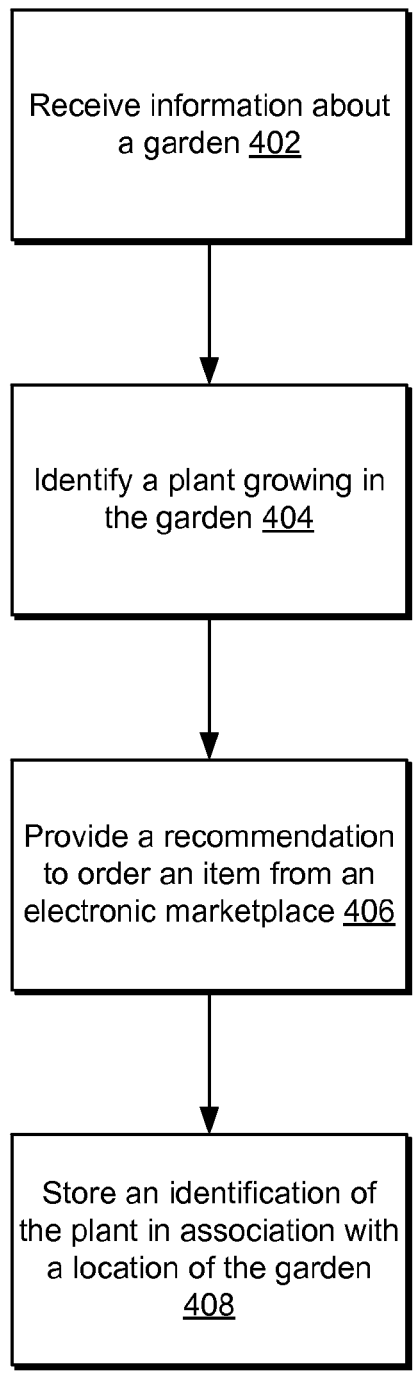
FIG. 4 illustrates an example flow for identifying garden items and providing recommendations for other garden items, according to embodiments.
Figure 5:
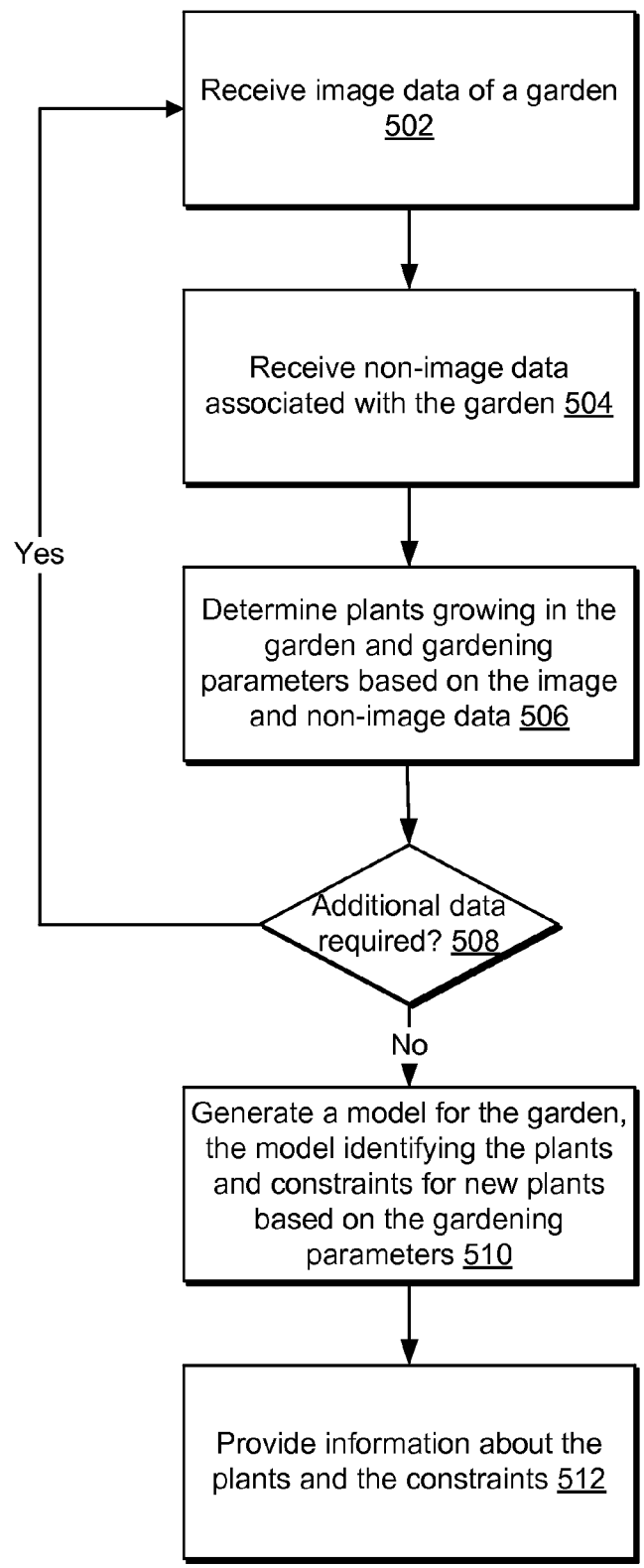
FIG. 5 illustrates an example flow for identifying items growing in a space, according to embodiments.
Figure 6:
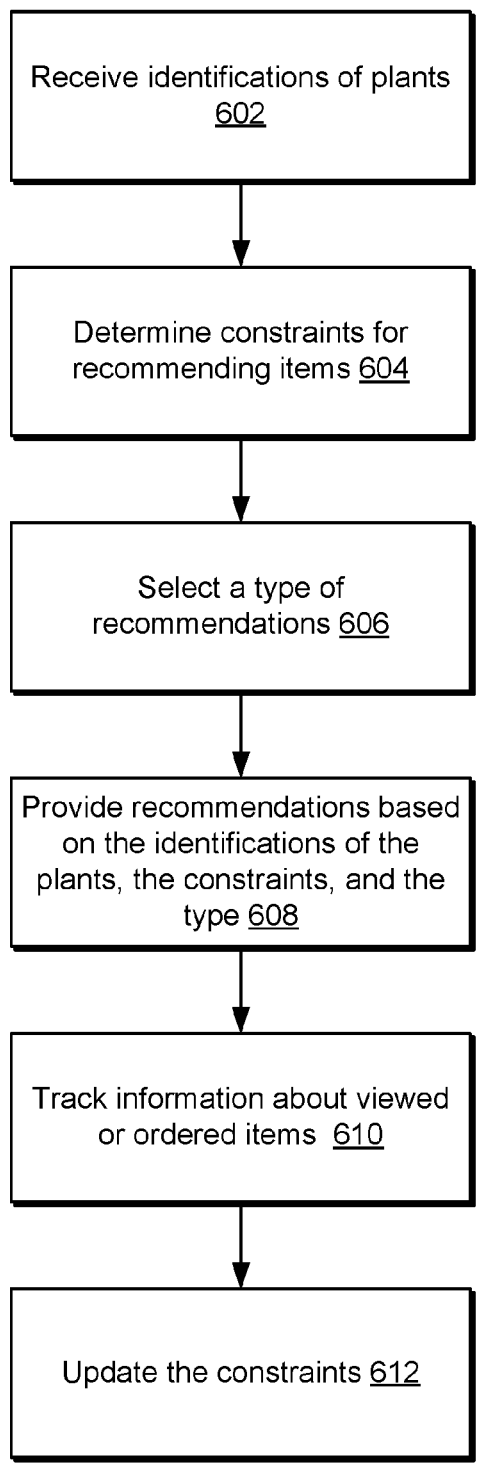
FIG. 6 illustrates an example flow for providing a recommendation to order items, according to embodiments.

Turning to FIGS. 4-6, these figures illustrate example flows for identifying plants and/or items growing in a physical space, such as a garden, and providing related recommendations. More particularly, FIG. 4 illustrates an example high-level flow for identifying plants based on information about a garden and for providing a recommendation based on the plants and/or constraints. In comparison, FIG. 5 illustrates a more detailed example flow for identifying items in a physical space, while FIG. 6 illustrates a more detailed example flow for providing the recommendations. Operations of the example flow of FIG. 4 may be further embodied in operations of the example flows of FIGS. 5 and 6. Thus, some operations may be similar. Such similarities are not repeated herein in the interest of clarity of explanation.

Further, in the illustrative operations, each of the operations or functions may be embodied in, and fully or partially automated by, modules executed by one or more processor devices of a computing device. Although a garden service, such as the garden service 216 of FIG. 2 or the garden service 342 of FIG. 3, is illustrated as performing operations of the flows, another service or module, or a combination of other services and modules may be additionally or alternatively used. While many references herein are made to the garden service 216, it should be understood that the techniques described may be utilized on any type of physical space and for any type of items that may be growing or otherwise existing in that physical space, and should not be limited to gardens, plants, or garden items. Also, while the operations are illustrated in a particular order, it should be understood that no particular order is necessary and that one or more operations may be omitted, skipped, and/or reordered.

The example flow of FIG. 4 may start at operation 402, where a garden service may receive information about a physical space. For example, the garden service may receive the information from a computing device of a user. The user may be associated with the physical space and may operate the computing device to request an identification of items growing in the physical space and for related recommendations. The received information may include image data and non-image data. The image data may represent a plurality of images of the physical space taken from different corners or locations in the physical space. The non-image data may include information about a location of the physical space, cardinal directions of the images, a time associated with a request for identifying the items, and/or other information.

At operation 404, the garden service may identify one or more items growing in the physical space. The physical space may further provide information about the items to the computing device. For example, the garden service may implement an image recognition algorithm to analyze the image data to identify the items. The garden service may also use the information from the non-image data in the analysis to filter out unlikely items. For example, based on the location, the garden service may eliminate certain items or plants from consideration (e.g., if the physical space is in a humid region, a desert cactus may not be considered). Similarly, based on the time of the request, the garden service may perform such elimination (e.g., in a winter time, the garden service may not consider non-evergreen trees in the analysis).

Further, based on the analysis, the garden service may determine objects in the physical space. Accordingly, the garden service may generate a model of the physical space, where the items and the objects may be represented. This model may be provided to a computing device of a user for display at a user interface. In an example, the model can be displayed as a virtual physical space.

At operation 406, the garden service may provide one or more recommendations to order an item from an electronic marketplace. The garden service may provide information about the recommendations to the computing device. This may allow the user to review the recommendations and perform additional actions. The recommendations may be based on the determined items and can include various types of recommendations. One recommendation type may be based on uses of the identified items and may include, for example, recipes that may only use these items for ingredients. Another recommendation type may be similarly based on uses of the identified items but may include, for example, recipes that may additionally use other ingredients. The garden service may not only identify the other ingredients, but may also facilitate how these ingredients may be purchased from the electronic marketplace. Yet another recommendation type may be based on relationships of the identified items with other physical space items, such as other items or plants, gardening tools, or other items. In this case, the garden service may also identify and facilitate purchases of the other physical space items from the electronic marketplace.

To recommend other items, the garden service may further analyze the image data and the non-image data to determine various constraints. The constraints may relate to the identified items, the physical space, the objects, and/or the user. Constraints related to an item may include what other items may be compatible therewith (e.g., whether another item can be safely planted in the vicinity of the item), water constraints, soil constraints, harvesting and over-harvesting constraints, and other constraints. Constraints related to the physical space may include location, weather, sunlight, and shade constraints. Constraints related to the objects may include shade zones that these objects may create, structural requirements that should be observed (e.g., a concrete wall may prohibit planting a tree with deep roots that can weaken the wall's structural integrity), and other constraints. Constraints related to the user may include user preferences, budgets, allergies, items (e.g., recipe ingredients) already in possession of the user, and other constraints. An example of a user preference may include a preferred cuisine, food type, or the like.

The recommendations and/or the constraints may be summarized at the user interface. For example, the user interface may describe the recommendations in conjunction with displaying the virtual physical space and may allow drag and drop operations to add physical space items, such as new items, from the recommendations into the virtual physical space. When an item is added to the virtual physical space, the garden service may automatically add the item to a user shopping cart at the electronic marketplace. Similarly, the garden service may display in the virtual physical space various constraints. For example, the garden service may use a visual effect (e.g., a highlight) to display a shade zone or a stay away zone. Further, the recommendations may be ranked in a priority order and displayed at the user interface according to this order. In an example, some or all of the constraints can be used to rank the recommendations. For instance, recommendations that best match the user preferences may be listed first. If a user constraint indicates a particular physical capability of the user (e.g., tall enough, muscular, etc.), a recommendation for an item (e.g., a high tree) or a tool (e.g., a heavy power tool) that may meet this capability may be ranked higher than other recommendations. Similarly, recommendations that create the most amount of conflict between existing and new items may be listed last. In yet another example, the garden service may use information about the physical space independent of or in conjunction with the constraints to rank the recommendations. For instance, the garden service may identify the existing items and may assume that the user may already possess the proper gardening tools for these items. As such, the garden service may rank new gardening tools not likely in the user's possession higher than the likely existing gardening tools. In a further example, the garden service may rank the recommendations based on the information therein. For example, a recommended particular item may use less effort and resources than another recommended item. In this case, the particular item may be ranked higher.

At operation 408, the garden service may store one or more identifications of the one or more items in association with the location of the physical space. This may allow generating records of the items that may exist in the physical space and may facilitate various services as described herein above. The garden service may also track and store user selections of items from the recommendations. This may allow determining user preferences and/or updating constraints for generating further recommendations.

Turning to FIG. 5, that figure illustrates an example flow for identifying items in a physical space. In response to a request for an identification of an item, a garden service may perform the example flow to output such identification and related information. Receiving a request and outputting item identification may be facilitated in part by a user interface at a computing device. The user interface may be configured to allow an input of the request and a display of the identification and related information.

The example flow of FIG. 5 may start at operation 502, where the garden service may receive image data of a physical space. The image data may represent a plurality of images taken from one or more corners or locations of the physical space.

At operation 504, the garden service may receive non-image data associated with the physical space. The non-image data may identify cardinal directions of the images, a location of the physical space, a time for requesting the item identification, and/or other information. The garden service may receive the data from different sources. For example, the computing device may transmit the location of the physical space along with the image data, but not necessarily the time of the request to the garden service. On the other hand, the garden service may determine the time of the request as a timestamp of when the request may have been received.

At operation 506, the garden service may determine items growing in the physical space and gardening parameters based on the image data and the non-image data. More particularly, the garden service may determine the types of the items and related gardening parameters such as harvesting season of the items, trimming season of the items, currently used gardening space, available space for gardening, season, sunlight, location, weather, access to water, and/or other parameters. Some or all of these parameters may be further used to set constraints on recommendations. Additionally, the garden service may determine objects in the physical space, which may facilitate the generation of a model for the physical space.

To determine the items, objects, and gardening parameters, the garden service may have access to a physical space library and other network-based resources. To determine the items and objects, the garden service may implement an image recognition algorithm that may analyze the images and classify the content of the images between items, objects, and other classifications. The image recognition algorithm may further analyze the items to determine the types. Other techniques may also be used to determine the items and the objects, and the associated types, such as techniques that may implement machine learning algorithms. To determine the gardening parameters, the garden service may query the gardening library and the other network-based resources using information about the items and information about the physical space (e.g., information from the non-image data such as location, time, and other information). These operations are further described herein next.

To determine the types of the items, the image recognition algorithm may be configured to determine one or more or a combination of factors, where each factor may be weighed differently. These factors may include a leaf, a fruit, a flower, a size, or an overall shape of the item. By using, for example, color mapping and edge detection techniques, the image recognition algorithm may determine each of these factors for an item. The garden service may query the physical space library using these factors to receive an identification and additional information about the item. The additional information may include some of the gardening parameters such as the harvesting season, the trimming season, and/or other parameters.

The weights of the factors can be predetermined (e.g., pre-set or dynamically adjusted by a service provided of the garden service). Additionally or alternatively, the weights can be set dependently on the factors. For example, the image recognition algorithm may output a likelihood, or some other confidence or error measure, associated with identifying a factor (e.g., the item has this shape and size of leaf with 95% likelihood or some other percentage). A weight for a factor can be a function (e.g., proportion to) the corresponding likelihood.

Further, the image recognition algorithm can improve the accuracy of the determination by using various techniques and combinations thereof. To illustrate, consider the leaf factor, although similar techniques can be applied to some or all of the other factors. To improve the accuracy of analyzing a leaf, the image recognition algorithm may be configured to select and analyze a group of leaves of a same item. The image recognition algorithm may analyze all the leaves or may select the leaves that are shown properly in the analyzed image (e.g., leaves with shown with a good top view). If no leaf is properly shown in the image or if the accuracy of the analysis falls below a predefined threshold, the garden service may perform operation 508. At operation 510, the garden service may request, via a user interface, a user to provide an additional image(s) of the item. This request may include instructions on what a proper view of the leaves may be. Additionally or alternatively, at operation 508, the garden service may provide the image data (e.g., the images) to an image analysis service and may receive an analysis of the leaves or an identification of the item from the image analysis service. This image analysis service may employ other image recognition and/or machine learning algorithms and/or may use a manual review process. Returning to operation 506, if the analysis erroneously indicates different items, the garden service may adopt a majority rule (e.g., the item is of the type that is most frequently identified by the analysis results). Additionally or alternatively, the garden service may choose the analysis results that may have likelihoods over a certain threshold and apply the majority rule to these results.

The garden service may implement similar image recognition algorithms to determine the objects in the physical space. However, the garden service need not determine the types of the objects. Thus, other techniques may be also implemented. For example, the garden service may implement a different image recognition algorithm, where the image recognition algorithm may be configured to recognize the objects, compute relative sizes of the objects, and compute relative distances between the objects and other objects and/or the items. Additionally or alternatively, the garden service may implement a machine learning algorithm to determine the objects and the related information. Once the items and the objects are recognized, the garden service may determine the currently used gardening space and the available space for gardening by applying a process of deduction based on the results of the image recognition algorithm.

To determine season and sunlight parameters, the garden service may interact with a network-based resource to input the time and the location and receive an identification of the season and sunlight hours. The time information may be further used in querying the physical space library to identify the types of the items. For example, if the time information indicates that it is winter, the garden service may filter out any analysis that does not return evergreen items. Similarly, the garden service may filter out results that may indicate an item type based on a fruit that may not be in season.

To determine weather and to access to water parameters, the garden service may use the location and time information to query and receive such parameters from a network-based resource. For example, this resource may keep up-to-date information about drought season, rainfall amounts, weather forecast, and other information.

At operation 510, the garden service may generate a model for the physical space. The model may identify the items. The model may also identify the objects. Further, the garden service may determine based on the gardening parameters constraints associated with adding new items to the physical space. Accordingly, the garden service may add the constraints to the model.

In an example, the model may include a virtual physical space. The garden service may generate the virtual physical space by assembling images from the image data and by orienting the images and the model according to the cardinal directions. The items and the objects may be tagged in the virtual physical space for identification. Some of the tags (e.g. the item tags) may be interactive to allow a user selection of a particular item, where the selection may cause the garden service to provide additional information about the particular item.

The garden service may also show the constraints in the model. For example, the garden service may determine and present the constraints in the virtual physical space. To determine the constraints, the garden service may use the gardening parameters. For example, a constraint related to what items can be added to the physical space can take into account the available gardening space and any information retrieved from the physical space library that indicate what items may be incompatible with the existing items in the physical space. To determine a shade constraint, the garden service may use the sunlight hours, the orientation of the model, and the sizes and locations of the items and objects in the model to compute the shade around the items and the objects. To determine a harvesting constraint, the garden service may use the harvesting parameter and a record of previous user selection (e.g., whether the user has been selecting recipes that may use tomatoes from the physical space) to compute a remaining amount for harvesting an item. Weather, soil, temperature, and other constraints can be similarly determined from the corresponding gardening parameters. For example, by interacting with a network-based resource, the garden service may determine what items can be added to the physical space based on the weather, soil, and temperature in the area where the physical space may be located. These constraints may be presented in different ways in the virtual physical space. For example, one visual effect may be used to show a shade zone around an object, and another visual effect may be used to show what space may be available for gardening.

At operation 512, the garden service may provide information about the items and the constraints. For example, the physical spaces service may provide a user interface configured to use the model. For example, the user interface may display the virtual physical space and may allow a user to interact with the virtual physical space to receive information about the physical space, including information about the items and the constraints.

Turning to FIG. 6, that figure illustrates an example flow for recommending physical space items. In an example, once items in a physical space are identified or a model of the physical space is generated, a garden service associated with an electronic marketplace may recommend physical space items. Generally, there can be different types of recommendations. One type may include recipes that may use some of the items as ingredients. Another type may include recipes that may also use other ingredients not found in the physical space. Yet another type may include physical space items, such as items that may be added to the physical space, gardening tools, and/or other physical space items. The garden service may display information about the recommendations at a user interface of a computing device and may allow a user of the computing device to select one or more of the recommendations or items identified in the recommendations for purchase.

The example flow of FIG. 6 may start at operation 602, where the garden service may receive identifications of the items. For example, the garden service may have access to the model of the physical space, where the model may store information about the items including the identifications.

At operation 604, the garden service may determine constraints for recommending items. The recommendations may relate to physical space items, such as recipes, additional items that can be added to the physical space, gardening tools, and other physical space items. The constraints may relate to the items, the physical space, objects in the physical space, and/or the user. For example, a constraint related to an item may limit what additional items may be grown in proximity to the item, a harvesting limit, and/or other constraints. A constraint related to the physical space may be based on an attribute of the physical space (e.g., available gardening space in the physical space or other attributes). This type of constraint may limit a space where additional items may be added, a type of these items, and/or other constraints. For example, there may be shade zones in the physical space that may limit the type of items. In another example, the location of the physical space may further limit the type of items based on the weather, the seasons, access to water, and other gardening parameters. A constraint related to an object may limit the types of items that can be grown in proximity of the object. For example, an object may be associated with a shade zone that can limit the type of items to low-shade items. Similarly, the object may have a certain structure (e.g., a concrete wall) that may limit the type of items to trees that cannot have deep roots. A constraint related to the user may limit what the user may perceive as a relevant or valuable recommendation. For example, user preferences, past user selections, budgets set by the user, items in possession of the user (e.g., recipe ingredients), and/or uses of the recommendations may limit what physical space items should be recommended.

The garden service may retrieve the different constraints from the model of the physical space and/or from records of user interactions with the garden service and/or the electronic marketplace. For example, the physical space model may store constraints related to the items and the physical space based on various gardening parameters. Additionally, the records of the user interactions may be analyzed to determine the user constraints.

At operation 606, the garden service may select one or more types of recommendations. As described herein above, there can be different types of recommendations for recommending different types of physical space items. One type of recommendations may include information about recipes that may use some or all of the items in the physical space. A similar but yet different type of recommendations may include recipes that may also use other ingredients available for purchase at the electronic marketplace. Another type of recommendation may include non-recipe physical space items, such as additional items, gardening tools, recipe books, gardening books, and/or other physical space items. The garden service may select any or all of these recommendation types and may accordingly perform the remaining operations of the example flow of FIG. 6. For example, the garden service may select to only recommend recipes and, thus, may only display information about such recipes at the user interface. In another example, the garden service may select all types of recommendations and, thus, may display information about recipes and non-recipe physical space items at the user interface. In this example, the garden service may configure the display of the information according to the type of recommendations. For example, recipes that may only use the items from the physical space may be shown in one category (e.g., a window, a tab, or a portion of the display), recipes that may use other ingredients may be shown in another category, and information about non-recipe physical space items may be also shown in yet another category.

At operation 608, the garden service may provide recommendations based on the identification of the items, the constraints, and the one or more selected types of recommendations. For example, the garden service may implement or may interface with a recommendation engine that may query a physical space library and/or source of information of the electronic marketplace for recommendations based on these different parameters. For instance, the recommendation engine may use the item identifications to query the physical space library to retrieve information related physical space items, such as recipes and non-recipe physical space items. Results of the query or parameters for the query may account for the constraints. For example, the results may be ranked and/or some of the results may be filtered out based on some or all of the constraints. For instance, a result for a new item that may cause a conflict with an existing item may be filtered out. Similarly, a result for a recipe that may include an ingredient that the user may be allergic to may be filtered out. In another example, some or all of the constraints may limit the parameters for the query. For example, instead of searching for all gardening tools, the garden service may search for tools that may be within a user budget.

Providing the recommendations may include displaying information about the recommendations at the user interface. In general, the information may describe various aspects of the recommendations that may be interesting to the user. For example, the recipes may list the ingredients, identify the associated quantities, and provide cooking instructions. The recipes may also include instructions on how to harvest and maintain the items and may provide links to purchase additional ingredients. Similarly, information about the non-recipe physical space items may include descriptions, ways to purchase, instructions of use, and/or other information related to these items.

Displaying the information may be interactive. For example, the garden service may cause the user interface to display the recommendations in conjunction with displaying a virtual physical space based on the model of the physical space and to interactively add physical space items to the virtual physical space or to a shopping cart. As such, the user interface may be configured to allow drag and drop operations allowing the user to select a physical space item from a recommendation for addition to the virtual physical space. Similarly, selecting a physical space item may cause the shopping cart to be updated with information about the selected physical space item.

At operation 610, the garden service may track information about viewed or ordered items. For example, the garden service or some other service of the electronic marketplace interfacing with the garden service may record the various interactions of the user's computing device with the displayed recommendations. For instance, viewing information about a particular recommendation or a particular physical space item identified in the recommendation, purchasing the physical space item, selecting a recipe, rating a recipe or a physical space item, and/or other information may be recorded.

At operation 612, the garden service may update the constraints based on the tracked information. For example, the user interactions (e.g., viewing or purchasing a particular physical space item, selecting a recipe, rating a recipe) may indicate a user preference. Similarly, selecting a recipe that may use portions of an item from the physical space may limit how further this item may be used in other future recipe recommendations. Selecting a new item for growing the physical space may set a new constraint associated with this item. As such, the physical spaces service may analyze the tracked information to accordingly update the constraints.

Figure 7:
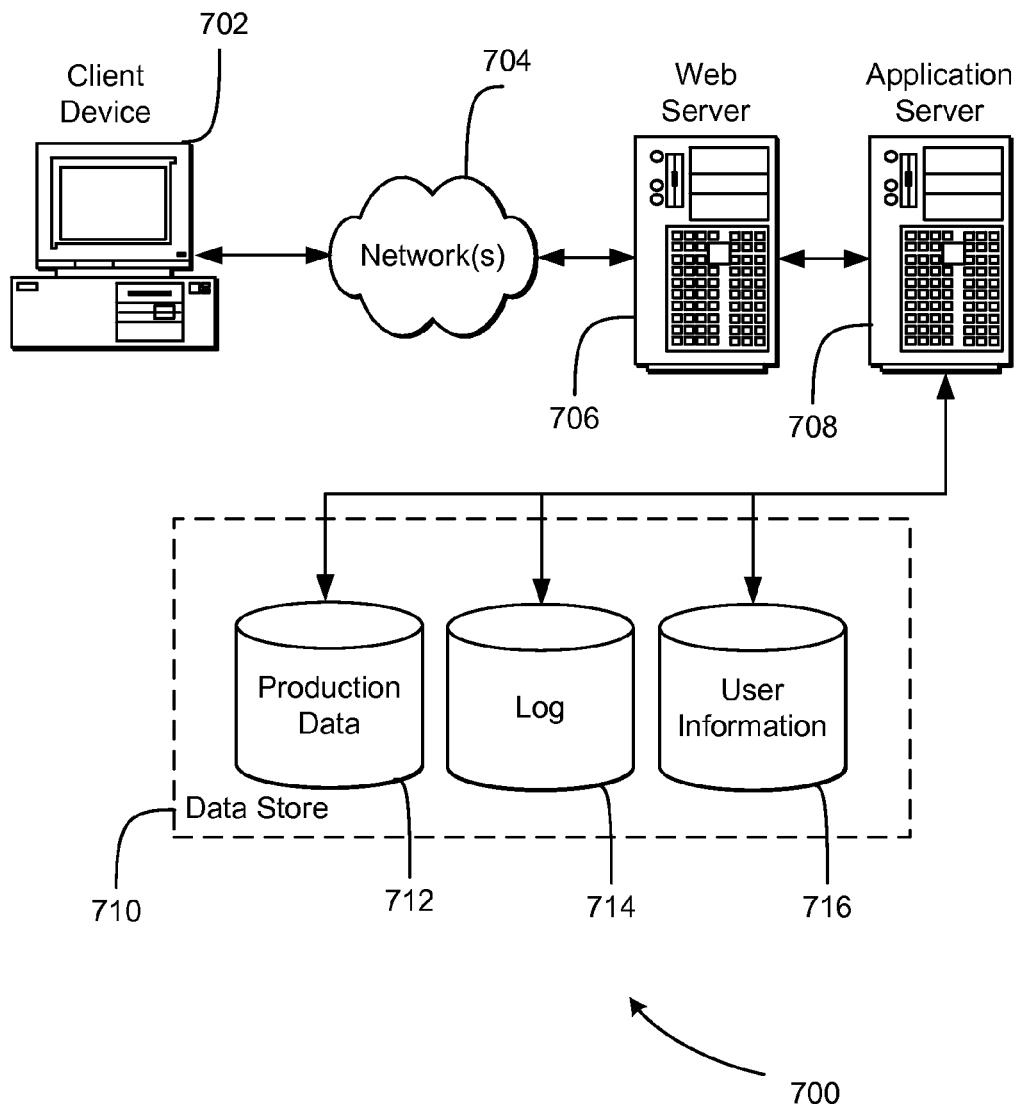
FIG. 7 illustrates an environment in which various embodiments can be implemented.

Turning to FIG. 7, the figure illustrates aspects of an example environment 700 capable of implementing the above-described structures and functions. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network(s) 704 and convey information back to a user of the device. Examples of such client devices include personal computers, cell phones, handheld messaging devices, laptop computers, set-top boxes, personal data assistants, electronic book readers, or any other computing device. The network(s) 704 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, and the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server 708 provides access control services in cooperation with the data store 710, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers 706, 708 are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store 710 illustrated includes mechanisms for storing production data 712 and user information 716, which can be used to serve content for the production side. The data store 710 is also shown to include a mechanism for storing log data 714, which can be used for reporting, analysis, or other such purposes. It should be understood that there can be many other aspects that may need to be stored in the data store 710, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the client device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of environment 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system from a computing device of a user, an image and cardinal directions of the image associated with a gardening space;
identifying, by the computer system, a plant and an object in the gardening space based at least in part on the image, wherein the plant and the object are identified by at least:
classifying content of the image between a plant classification and an object classification,
for first content of the image classified under the plant classification and corresponding to at least a portion the plant, identifying a type of the plant based at least in part on an application of an image recognition algorithm to the first content and on a result of a query to a database that stores information about plants, the application of the image recognition algorithm comprising:
identifying a factor associated with the type of the plant based at least in part on a frequency of the factor appearing in the first content, and
determining a weight of the factor based at least in part on a confidence measure of the image recognition algorithm,
the query to the database generated based at least in part on the factor, and the result of the query weighted based at least in part on the weight of the factor; and
querying, by the computer system, the database based at least in part on the type of the plant to determine a gardening parameter;
determining, by the computer system, a constraint associated with the plant based at least in part on the gardening parameter and the object, the constraint limiting recommendations of items for use in association with a use of the plant;
generating, by the computer system, an interactive virtual space that corresponds to the gardening space by at least:
assembling and orienting the image with other images of the gardening space based at least in part on the cardinal directions of the image,
adding, to the interactive virtual space, an interactive first tag corresponding to the plant and an interactive second tag corresponding to the object, and
adding, to the interactive virtual space, a visual effect that corresponds to the constraint;
providing, by the computer system, to the computing device of the user, instructions to present the interactive virtual space and a recommendation to order an item from an electronic marketplace based at least in part on the constraint and the plant, the recommendation identifying the item and an association of the item with the plant, the instructions causing the computing device to present the interactive virtual space and the recommendation and to provide a drag and drop operation to add the item to the interactive virtual space; and updating, by the computer system, the interactive virtual space based at least in part on a use of the drag and drop operation to add the item, the updating comprising adding, to the interactive virtual space, the first interactive tag that corresponds to the item.

2. The computer-implemented method of claim 1, wherein the recommendation further identifies a plurality of items associated with a recipe, the recipe including at least a portion of the plant as an ingredient.

3. The computer-implemented of claim 1, further comprising: for second content of the image classified under the object classification and corresponding to at least a portion of the object, recognizing the object based at least in part on an application of a different image recognition algorithm to the second content.

4. The computer-implemented of claim 1, further comprising: updating, by the computer system, a record in a database associated with recommendations, the record updated based at least in part on the use of the drag and drop operation, the record tracking a selection of the item from the recommendations.

5. A system, comprising:
a memory configured to store computer-executable instructions; and
a processor configured to access the memory and execute the computer-executable instructions to collectively at least:
receive, from a computing device of a user, information about a physical space for growing items, the information comprises an image of the physical space and cardinal directions of the image;
identify a garden item growing in the physical space by at least:
identifying a type of the garden item based at least in part on an application of an image recognition algorithm to content of the image and on a result of a query to a database that stores information about garden items, the application of the image recognition algorithm comprising:
identifying a factor associated with the type of the garden item based at least in part on a frequency of the factor appearing in the content, and
determining a weight of the factor based at least in part on a confidence measure of the image recognition algorithm,
the query to the database generated based at least in part on the factor, and the result of the query weighted based at least in part on the weight of the factor; and
querying the database based at least in part on the type of the garden item to determine a gardening parameter;
determine a constraint associated with the garden item based at least in part on the gardening parameter, the constraint limiting recommendations of items for use in association with a use of the garden item;
generate an interactive virtual space that corresponds to the physical space by at least:
assembling and orienting the image with a plurality of images of the physical space based at least in part on the cardinal directions of the image,
adding, to the interactive virtual space, an interactive tag corresponding to the garden item, and
adding, to the interactive virtual space, a visual effect that corresponds to the constraint;
provide, the computing device, instructions to present the interactive virtual space, a recommendation to order an item from an electronic marketplace based at least in part on the garden item and the constraint, and a selection operation to add the item to the interactive virtual space, the interactive virtual space comprising a second interactive tag that corresponds to the item; and
update the interactive virtual space based at least in part on a use of the selection operation to add the item, the updating comprising adding, to the interactive virtual space, the second interactive tag that corresponds to the item.

6. The system of claim 5, wherein the information about the physical space comprises the plurality of images of the physical space.

7. The system of claim 6, wherein identifying the garden item and the constraint comprises:
determining the factor associated with the type of the garden item based at least in part on analyzing the plurality of images.

8. The system of claim 7, wherein the information further comprises cardinal directions associated with the plurality of images and a location of the physical space, and wherein determining the constraint further comprises:
determining an object in the physical space based at least in part on analyzing the plurality of images;
determining a sunlight condition and a shade zone based at least in part on the object, the location, and the cardinal directions associated with the plurality of images; and
setting the constraint as at least one of the sunlight condition or the shade zone.

9. The system of claim 5, wherein the constraint is further associated with at least one of the space or the user, wherein a garden item constraint limits the recommendation to order the item based at least in part on a compatibility between the garden item and the item, wherein a space constraint limits the recommendation to order the item based at least in part on an attribute of the physical space, and wherein a user constraint limits the recommendation to order the item based at least in part on previous interactions between the computing device of the user and the electronic marketplace.

10. The system of claim 5, wherein providing the recommendation to order the item comprises:
identifying the constraint based at least in part on a location of the physical space;
searching for items based at least in part on the constraint; and
selecting the item from the items based at least in part on a user constraint.

11. The system of claim 5, wherein providing the recommendation to order the item comprises:
providing information about the garden item, the item, and an association between the garden item and the item to the computing device of the user;
ranking the information about the garden item, the item, and an association between the garden item and the item based at least in part on the constraint, and
causing the computing device of the user to display the information about the garden item, the item, and an association between the garden item and the item based at least in part on the ranking.

12. The system of claim 11, wherein causing the computing device of the user to display the information comprises:
displaying the information in the virtual space;
allowing a selection of the item in the interactive virtual space; and
displaying the item in the interactive virtual space based at least in part on the selection.

13. The system of claim 12, wherein displaying the item in the interactive virtual space causes an update to a cart associated with the electronic marketplace, the update comprising an identification of the item.

14. The system of claim 5, wherein the information received from the computing device further comprises a location of the physical space and an orientation of the image, wherein the garden item comprises a plant, wherein identifying the garden item and the constraint comprises:
identifying the plant and an object in the physical space based at least in part on the image;
identifying the constraint based at least in part on the plant, the object, and the location; and
generating a model of the physical space, the model identifying the plant, the object, and the constraint, wherein providing the recommendation comprises generating the interactive virtual space from the model.

15. One or more computer-readable storage media storing computer-executable instructions that, when executed by one or more computer systems, configure the one or more computer systems to perform operations comprising:
receiving an image of a physical space for growing items;
identifying an item growing in the physical space by at least:
identifying a type of the item based at least in part on an application of an image recognition algorithm to content of the image and on a result of a query to a database that stores information about items, the application of the image recognition algorithm comprising:
identifying a factor associated with the type of the item based at least in part on a frequency of the factor appearing in the content, and
determining a weight of the factor based at least in part on a confidence measure of the image recognition algorithm,
the query to the database generated based at least in part on the factor, and the result of the query weighted based at least in part on the weight of the factor; and
querying the database based at least in part on the type of the item to determine a gardening parameter;
generating an interactive virtual space of the physical space by at least:
assembling and orienting the image with a plurality of images of the physical space based at least in part on cardinal directions of the image,
adding, to the interactive virtual space, an interactive tag corresponding to the item;
determining a recipe for using a portion of the item and another ingredient;
providing instructions to present the interactive virtual space, a recommendation to obtain the other ingredient from a network-based resource, and a selection operation to interact with the item in the interactive virtual space, the recommendation comprising the recipe and an identifier of the other ingredient; and
updating the interactive virtual space based at least in part on a use of the selection operation to interact with the item, the updating comprising an update, in the interactive virtual space, to the interactive tag that corresponds to the item.

16. The one or more computer-readable storage media of claim 15, wherein determining the recipe comprises:
determining a user preference based at least in part on previous recommendations;
searching for recipes based at least in part on the item and the user preference;
determining a constraint associated with the item based at least in part on selections of previously recommended recipes that use portions of the item, the constraint limiting an amount of harvesting the item; and
selecting the recipe from the recipes based at least in part on the constraint.

17. The one or more computer-readable storage media of claim 15,
wherein the factor comprise at least one of a leaf, a fruit, a size, or shape of the item.

18. The one or more computer-readable storage media of claim 17, wherein identifying the item comprises:
identifying likelihoods of at least one potential type of the item based at least in part on comparing the factor to information about items from the database, the likelihoods associated with the factor;
adjusting the likelihoods based at least in part on the weight; and
determining that the item is of a particular type based at least in part on the adjusted likelihoods.

19. The one or more computer-readable storage media of claim 15, wherein the image is received from a computing device of a user, wherein identifying the item comprises determining a likelihood of the type of the item, the operations further comprising:
comparing the likelihood to a threshold; and
requesting an additional image of the physical space from the computing device of the user based at least in part on the comparison.

20. The one or more computer-readable storage media of claim 15, wherein identifying the item comprises determining a likelihood of the type of the item, the operations further comprising:
comparing the likelihood to a threshold;
providing the image to a computing device based at least in part on the comparison; and
receiving an identification of the type of the item from the computing device.

* * * * *

UNITED STATES PATENT AND TRADEMARK OFFICE
CERTIFICATE OF CORRECTION

PATENT NO.        : 9,779,442 B1
APPLICATION NO.   : 14/303445
DATED             : October 3, 2017
INVENTOR(S)       : Senad Cimic and Sairam Chinta Page 1 of 1

It is certified that error appears in the above-identified patent and that said Letters Patent is hereby corrected as shown below:

In the Claims

In Column 25, Line 16, delete "The computer-implemented of claim 1" and insert --The computer-implemented method of claim 1--.

In Column 25, Line 22, delete "The computer-implemented of claim 1" and insert --The computer-implemented method of claim 1--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*